US007886335B1

(12) United States Patent
Chickering et al.

(10) Patent No.: US 7,886,335 B1
(45) Date of Patent: Feb. 8, 2011

(54) RECONCILIATION OF MULTIPLE SETS OF NETWORK ACCESS CONTROL POLICIES

(75) Inventors: Roger A. Chickering, Granite Bay, CA (US); Paul Funk, Cambridge, MA (US); Paul J. Kirner, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 874 days.

(21) Appl. No.: 11/827,598

(22) Filed: Jul. 12, 2007

(51) Int. Cl.
*G06F 17/00* (2006.01)
*G06F 17/30* (2006.01)
(52) U.S. Cl. .................................. 726/1; 726/2; 726/3
(58) Field of Classification Search ..................... 726/1, 726/2, 3
See application file for complete search history.

(56) References Cited

U.S. PATENT DOCUMENTS

| 6,161,139 | A | 12/2000 | Win et al. |
|---|---|---|---|
| 6,633,872 | B2 | 10/2003 | Ambrosini et al. |
| 7,178,166 | B1 | 2/2007 | Taylor et al. |
| 7,185,192 | B1 | 2/2007 | Kahn |
| 7,392,546 | B2 | 6/2008 | Patrick |
| 2001/0044894 | A1 | 11/2001 | Saito et al. |
| 2003/0055994 | A1 | 3/2003 | Herrmann et al. |
| 2003/0158929 | A1 | 8/2003 | McNerney |
| 2003/0196114 | A1 | 10/2003 | Brew et al. |
| 2004/0107360 | A1 | 6/2004 | Herrmann et al. |
| 2004/0111643 | A1 | 6/2004 | Farmer |
| 2004/0122910 | A1 | 6/2004 | Douglass et al. |
| 2004/0160903 | A1 | 8/2004 | Gai et al. |
| 2004/0225657 | A1 | 11/2004 | Sarkar |
| 2005/0021977 | A1 | 1/2005 | Oberst |
| 2005/0071658 | A1 | 3/2005 | Nath et al. |
| 2005/0235352 | A1 | 10/2005 | Staats et al. |
| 2005/0240550 | A1 | 10/2005 | Armes et al. |
| 2005/0246767 | A1 | 11/2005 | Fazal et al. |
| 2005/0251854 | A1 | 11/2005 | Shay |
| 2006/0026683 | A1 | 2/2006 | Lim |
| 2006/0075502 | A1 | 4/2006 | Edwards |
| 2006/0090208 | A1 | 4/2006 | Smith |
| 2006/0101517 | A1 | 5/2006 | Banzhof et al. |

(Continued)

OTHER PUBLICATIONS (Martin) Policy-Based Networks by Jean-Christophe Martin Sun BluePrints™ OnLine—Oct. 1999.*

(Continued)

*Primary Examiner*—David Y Jung
(74) *Attorney, Agent, or Firm*—Shumaker & Sieffert, P.A.

(57) ABSTRACT

In general, techniques are described for managing multiple access policies in a network access control system. An endpoint device may send, to a policy decision point ("PDP"), a request to communicate on a network. When the PDP receives such an access request, the PDP typically identifies a set of access policies to be enforced with regard to the endpoint device and causes the identified access policies to be enforced with regard to the endpoint device. These access policies may specify rights to communicate on networks and/ or rights to communicate with server resources and/or endpoint configuration requirements. However, because the endpoint device may issue multiple access requests, conflicting sets of access policies may potentially be enforced with regard to the endpoint device. The techniques described herein ensure that only a consistent set of access policies are enforced with regard to the endpoint device when accessing the network.

43 Claims, 7 Drawing Sheets

U.S. PATENT DOCUMENTS

2006/0179472 A1    8/2006    Chang et al.
2007/0006288 A1    1/2007    Mayfield et al.
2007/0056019 A1    3/2007    Allen et al.
2007/0143824 A1    6/2007    Shahbazi
2007/0169171 A1    7/2007    Kumar et al.

OTHER PUBLICATIONS

Design and implementation of policy decision point in policy-based network; Geonlyang Kim; Jinoh Kim; Jungchan Na; Computer and Information Science, 2005. Fourth Annual ACIS International Conference on; Publication Year: 2005, pp. 534-538.*

Policy-based congestion management for an SMS gateway; Prieto, A.G.; Cosenza, R.; Stadler, R.; Policies for Distributed Systems and Networks, 2004. POLICY 2004. Proceedings. Fifth IEEE International Workshop on; Publication Year: 2004, pp. 215-218.*

Towards federated policy management; Hull, R.; Bharat Kumar; Lieuwen, D.; Policies for Distributed Systems and Networks, 2003. Proceedings. POLICY 2003. IEEE 4th International Workshop on; Publication Year: 2003, pp. 183-194.*

Nortel Networks, nortel secure network access architechture, Jul. 11, 2005, 15 pp.

U.S. Appl. No. 11/236,987, by Roger Chickering, filed Sep. 28, 2005.

Office Action from U.S. Appl. No. 11/236,987, dated Dec. 5, 2008, 42 pp.

Response to Office Action dated Dec. 5, 2008, from U.S. Appl. No. 11/236,987, filed Mar. 4, 2009, 16 pp.

Office Action from U.S. Appl. No. 11/236,987, dated May 28, 2009, 22 pp.

Response to Office Action dated May 28, 2009, from U.S. Appl. No. 11/236,987, filed Jul. 28, 2009, 14 pp.

Office Action from U.S. Appl. No. 11/236,987, dated Sep. 25, 2009, 24 pp.

Response to Office Action dated Sep. 25, 2009, from U.S. Appl. No. 11/236,987, filed Dec. 28, 2009, 16 pp.

Office Action from U.S. Appl. No. 11/236,987, dated Apr. 15, 2010, 23 pp.

Response to Office Action dated Apr. 15, 2010, from U.S. Appl. No. 11/236,987, filed Jul. 15 2010, 16 pp.

Office Action from U.S. Appl. No. 11/236,987, dated Sep. 30, 2010, 17 pp.

* cited by examiner

RECONCILIATION OF MULTIPLE SETS OF NETWORK ACCESS CONTROL POLICIES

TECHNICAL FIELD

The invention relates to computer networks and, in particular, to network access control.

BACKGROUND

Enterprises and other organizations implement network access control in order to control the ability of endpoint devices to communicate on a computer network. For example, an enterprise may implement a computer network that includes an email server. In order to prevent unauthorized users from communicating with this email server, the enterprise may implement a network access control system that prevents unauthorized users from sending network communications on the computer network unless the users provide a correct username and password. In another example, an enterprise may wish to prevent devices that are infected with computer viruses from communicating with devices on a network of the enterprise. In this example, the enterprise may implement a network access control system that prevents devices that do not have current anti-virus software from communicating on the network.

Enterprises may use the 802.1X protocol to implement network access control. Three separate types of devices are typically present in networks that implement network access control using the 802.1X protocol. These devices typically include: supplicant devices, policy decision points, and policy enforcement points. Supplicant devices are devices that are attempting to connect to the network. Policy decision points evaluate information from the supplicant devices in order to decide whether to grant the supplicant devices access to a network. Policy enforcement points enforce the decisions made by the policy decision points with regard to individual supplicant devices.

A supplicant device may send a connection request in the 802.1X protocol to the policy enforcement point. This connection request may be comprised of a series of 802.1X messages that the policy enforcement point may forward to the policy decision point. The policy decision point may send responses back to the policy enforcement point and the policy enforcement point may forward these responses back to the endpoint. These 802.1X messages may include security credentials (e.g., a username and password) and information about the "health" of the supplicant device.

The "health" information of the supplicant device may specify information that is relevant in determining whether the supplicant device is correctly configured. For example, the "health" information may specify whether a most current operating system patch is installed on the supplicant device, whether a most current version of anti-virus software has been installed on the supplicant device, and other information. Depending on the security credentials and the "health" information from the supplicant, the policy decision module may instruct the policy enforcement point to allow the supplicant device to communicate with resources on a network. For example, the policy decision module may instruct the policy enforcement module to associate communications from the supplicant with a particular virtual local area network (VLAN) that includes various resources.

Enterprises may also use other strategies to implement network access control, such as inserting firewalls between endpoint devices and server resources. In order to access the protected server resources, an endpoint device provides identity information and health information to a policy decision point. If the identity information and health information conform to the policy decision point's policies, the policy decision point may provision access to server resources for the endpoint device through firewalls (which are the policy enforcement points in this strategy).

Enterprises may combine multiple network access control strategies.

SUMMARY

In general, techniques are described for managing multiple access policies in a network access control system. In order to gain access to a network, an endpoint device sends, to a policy decision point ("PDP"), a request for access to the network. When the PDP receives such an access request, the PDP typically identifies a set of access policies to be enforced with regard to the endpoint device and causes the identified access policies to be enforced with regard to the endpoint device. These access policies may specify rights to communicate on networks, endpoint configuration requirements, and/or other privileges or requirements. However, because the endpoint device may issue multiple access requests, conflicting sets of access policies may potentially be enforced with regard to the endpoint device. The techniques described herein ensure that only a consistent set of access policies are enforced with regard to the endpoint device when accessing the network.

For example, a laptop computer may include a wired Ethernet interface and a wireless Wi-Fi interface. A user of the laptop computer may use a first username when connecting to a first network using the wireless interface while the laptop computer is in a conference room of an office building. The first network includes an email server, but not a file server. When the laptop computer connects to the PDP, the laptop computer may send to the PDP an identifier that identifies the laptop computer. After a PDP grants the laptop computer access to the first network, the user of the laptop computer carries the laptop computer to an office where the user plugs an Ethernet cable into the laptop computer. At this point, the laptop computer is still able to connected to the first, network via the wireless network and still has a connection to the PDP. When the user connects the laptop computer to the Ethernet network using the wired interface, the user provides a second username. Based on this second username, the user would be entitled to access to a second network. The second network includes the file server but not the email server. When the laptop computer connects using the wired interface, the laptop computer may again send the same identifier. The PDP may recognize that identifier and determine that there are two connections to the same device. For this reason, the PDP may instruct a policy enforcement point ("PEP") to allow the laptop computer to use the wireless interface to communicate with resources on the first network and resources on the second network. Furthermore, the PDP may instruct the PEP to allow the laptop computer to use the wired interface to communicate with resources on the first network and resources on the second network. In this way, a consistent set of access policies are enforced with regard to the laptop computer.

In one embodiment, a method comprises receiving a network communication with a network access control policy decision point ("PDP"). The network communication includes an access request from an endpoint device for access to communicate on a network. The method also comprises determining, in response to receiving the request, whether a first set of access policies is currently enforced with regard to the endpoint device due to an earlier network communication received by the PDP. The earlier network communication included a request from the endpoint device for access to communicate on a network. Access policies specify rights to communicate on networks and/or rights to communicate with server resources and/or endpoint configuration requirements. In addition, the method comprises identifying, when the first set of access policies is currently enforced with regard to the endpoint device, a second set of access policies. The method also comprises causing only access policies in the second set of access policies to be enforced with regard to the endpoint device.

In another embodiment, a policy decision device comprises a request reception module that receives a network communication. The network communication includes an access request from an endpoint device for access to communicate on a network. The policy decision device also comprises an enforcement detection module that determines, in response to receiving the request, whether a first set of access policies is currently enforced with regard to the endpoint device due to an earlier access request received by the policy decision point. The earlier network communication included a request from the endpoint device for access to communicate on a network. The access policies specify rights to communicate on networks and/or rights to communicate with server resources and/or endpoint configuration requirements. In addition, the policy decision device comprises a policy reconciliation module that identifies, when the first set of access policies is currently enforced with regard to the endpoint device, a second set of access policies. The policy decision device also comprises a policy communication module that causes, when the first set of access policies is currently enforced with regard to the endpoint device, only access policies in the second set of access policies to be enforced with regard to the endpoint device.

In another embodiment, a computer-readable medium comprises instructions. The instructions cause a programmable processor of a PDP to configure the PDP to receive a network communication. The network communication includes a request from an endpoint device for access to communicate on a network. The instructions also cause the programmable processor to determine, in response to receiving the request, whether a first set of access policies is currently enforced with regard to the endpoint device due to an earlier network communication received by the PDP. The earlier network communication included a request from the endpoint device for access to communicate on a network. Access policies specify rights to communicate on networks and/or rights to communicate with server resources and/or endpoint configuration requirements. The instructions also cause the programmable processor to identify, when the first set of access policies is currently enforced with regard to the endpoint device, a second set of access policies. In addition, the instructions cause the programmable processor to cause only access policies in the second set of access policies to be enforced with regard to the endpoint device.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
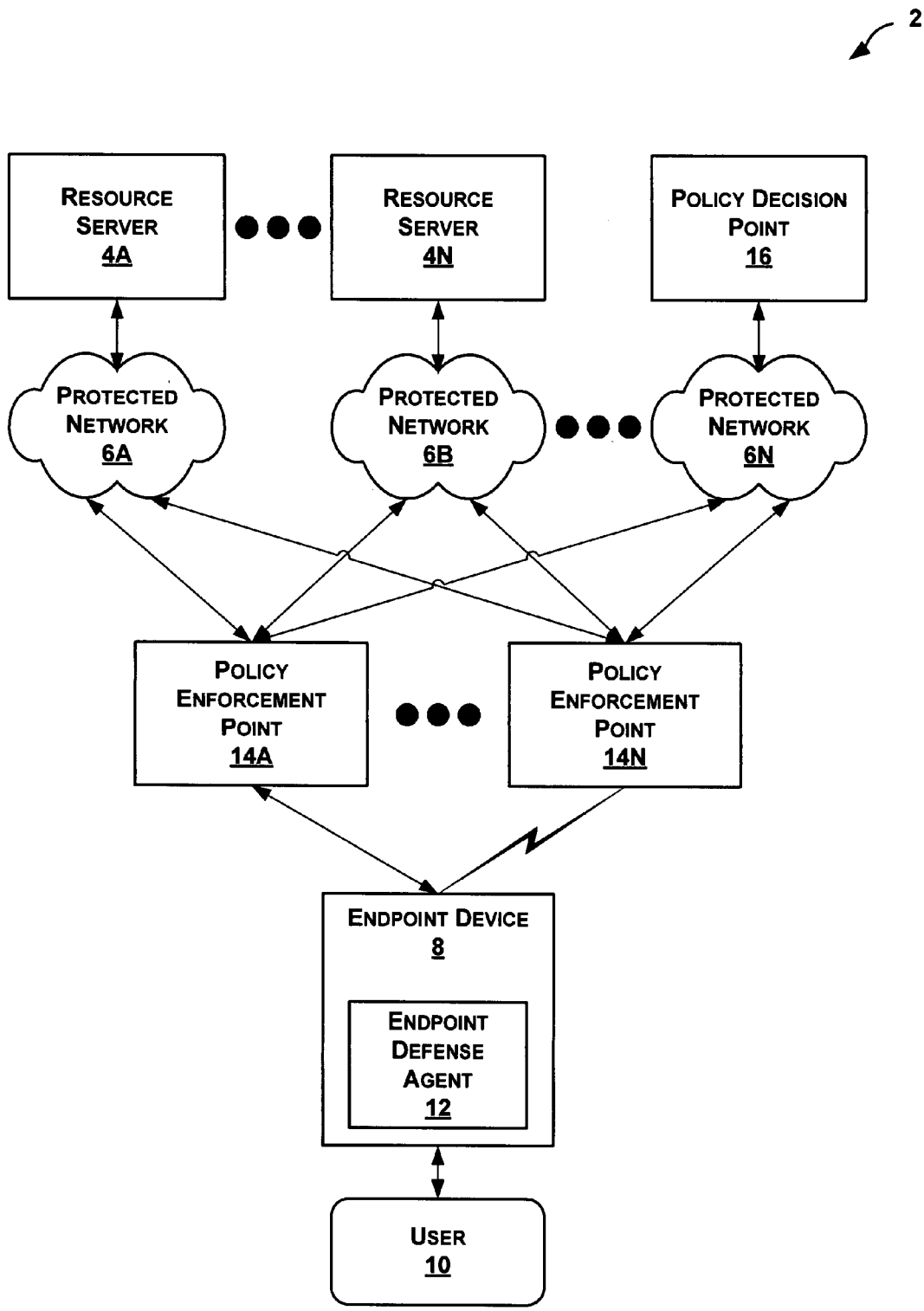
FIG. 1A is a block diagram illustrating an exemplary system that uses network access control.

FIG. 1A is a block diagram illustrating an exemplary system 2 that uses network access control. System 2 includes a set of resource servers 4A through 4N (collectively, "resource servers 4") that provide network resources. For example, resource server 4A may provide email services, resource server 4B may provide a network file system resource, resource server 4C may provide access to a database resource, resource server 4D may provide a streaming media resource, and resource server 4E may provide an Internet access resource. Other ones of resource servers 4 may provide other resources.

Resource servers 4 are connected to and communicate using ones of protected networks 6A through 6N (collectively, "protected networks 6"). Protected networks 6 may be physical local area networks ("LANs"), virtual local area networks ("VLANs"), wide area networks, or other types of networks.

System 2 also comprises an endpoint device 8 that is capable of using the network resources provided by resource servers 4. Endpoint device 8 may be a personal computer, a laptop computer, a personal digital assistant ("PDA"), a network telephone, a wireless telephone, a medical device, a network device integrated into a vehicle, a television set-top box, a home entertainment system, or any other type of network-enabled device.

A user 10 may use endpoint device 8. User 10 may wish to use endpoint device 8 to interact with resources provided by resource servers 4. For example, user 10 may wish to use endpoint device 8 to interact with a network file system resource provided by resource server 4B.

For security reasons, an enterprise may prevent endpoint device 8 from communicating on protected networks 6 unless the user of endpoint device 8 is authenticated and endpoint device 8 is correctly configured. Thus, in order for endpoint device 8 to interact with network resources provided by resource servers 4, the identities of users 10 may need to be authenticated and the configuration of endpoint device 8 may need to be verified. Endpoint defense agent 12 is installed on endpoint device 8 to help endpoint device 8 to authenticate the identity of user 10 and to verify the configuration of endpoint device 8. Endpoint defense agent 12 may be a software application that executes on endpoint device 8 and/or a hardware or firmware-based mechanism.

Before endpoint device 8 is able to interact with the network resources provided by resource servers 4, endpoint device 8 may first establish wired or wireless connections to one or more of policy enforcement points 14A through 14N (collectively, "PEPs 14"). PEPs 14 are network devices that facilitate and control communication between endpoint device 8 and protected networks 6. As described in detail below, PEPs 14 may also enforce access policies identified by a policy decision point ("PDP") 16 with regard to endpoint device 8. PDP 16 in system 2 is a network device that identifies access policies to be enforced with regard to endpoint device 8.

Endpoint device 8 may establish connections to PEPs 14 in a variety of ways. For example, one end of an Ethernet cable may be attached to a network interface of PEP 14A. In this example, user 10 may establish a connection between endpoint device 8 and PEP 14A by plugging the other end of the Ethernet cable into a network interface of endpoint device 8. In a second example, PEP 14A may communicate using a Wi-Fi protocol. In this second example, user 10 may establish a connection between endpoint device 8 and PEP 14A by bringing endpoint device 8 within range of PEP 14A and enabling a wireless network interface of endpoint device 8 to communicate using the Wi-Fi protocol. In a third example, PEP 14A may reside somewhere on any type of network between endpoint device 8 and resource server 4A. There may be any number of routers, switches, or any other type of network equipment between endpoint device 8 and PEP 14A, and also between PEP 14A and resource server 4A.

PEPs 14 may enforce access policies at various layers of the Open Systems Interconnection ("OSI") network model. For instance, each of PEPs 14 may enforce access policies at a link layer of the OSI network model or each of PEPs 14 may enforce access policies at a network layer of the OSI network model. Alternatively, various ones of PEPs 14 may enforce access policies at different layers of the OSI network model. For instance, PEP 14A may enforce access policies at the link layer of the OSI network model and PEP 14N may enforce access policies at the network layer of the OSI network model. When one of PEPs 14 enforces access policies at the link layer, the PEP may enforce access policies on a frame-by-frame basis. When one of PEPs 14 enforces access policies at the network layer, the PEP may enforce access policies on a packet-by-packet basis. Each one of PEPs 14 may enforce access policies at more than one layer of the OSI network model simultaneously.

Endpoint device 8 may use 802.1X to establish wired or wireless connections to ones of PEPs 14 that operate at the link layer. For example, PEP 14A may operate at the link layer and may be configured to use 802.1X authentication and endpoint device 8 may be connected to PEP 14A. In accordance with: the 802.1X protocol, when PEP 14A receives a link-layer message in the 802.1X protocol from endpoint device 8, PEP 14A repackages the message and forwards the message to PDP 16. Alternatively, if endpoint device 8 establishes wired or wireless connections to ones of PEPs 14 that operate at the network layer, endpoint 8 may use network layer protocols to communicate with these PEPs. When one of these PEPs 14 receives a network layer message from endpoint device 8, the PEP may forward the network layer message to PDP 16.

Endpoint device 8 exchanges messages with PDP 16 so that PDP 16 can determine which access policies to apply to device 8 based on the identity of user 10 and the health status report from endpoint defense agent 12. These messages may be sent first to PEP 14, and PEP 14 may forward them to PDP 16 and end point device 8. In other words, PEP 14 may serve as an intermediary between endpoint device 8 and PDP 16. Alternatively, endpoint device 8 may exchange messages with PDP 16 without these messages having to traverse PEP 14. In this case, endpoint 8 may send messages to PDP 16 on any type of network. There may be any number of routers, switches, or any other type of network equipment between endpoint device 8 and PDP 16.

As part of the authentication process, PDP 16 receives a health status report of endpoint device 8. The health status report of endpoint device 8 may comprise one or more messages that indicate the health status of endpoint device 8. As used herein, the term "health status" refers to a configuration of an endpoint device. For example, the health status of an endpoint device may indicate whether the endpoint device is currently utilizing a most recent version of an antivirus software application. In this example, endpoint device 8 may constitute a security risk if the most recent version of the antivirus software application is not installed because endpoint device 8 may be infected with a computer virus that poses a security threat to resource servers 4. In another example, the health status of endpoint device 8 may indicate whether a most recent operating system patch has been installed on endpoint device 8. Similarly, endpoint device 8 may constitute a security risk if the most recent operating system patch has not been installed on endpoint device 8 because a prior version of the operating system may include a security flaw that could allow a hacker to use endpoint device 8 to attack resource servers 4.

After PDP 16 receives the health status report of endpoint device 8, PDP 16 may identify a set of access policies to be enforced with regard to endpoint device 8. PDP 16 may identify a wide variety of access policies. For instance, PDP 16 may identify access policies that are generalized (e.g., access to an entire network). Other access policies may be specific (e.g., endpoint device 8 is not allowed to overwrite a particular file when doing a file transfer protocol put operation.) Furthermore, PDP 16 may identify access policies that are to be enforced by ones of PEPs 14, access policies that are to be enforced by endpoint device 8 itself, and access policies that are to be enforced by other devices and modules.

PDP 16 may use a wide variety of factors to identify the set of access policies. These factors may include, but are not limited to, the identity of the user, the role of the user within an organization, the health status of endpoint device 8, the resource requested by endpoint device 8, or other factors or any combination of factors. For example, PDP 16 may receive identity information that indicates that user 10 is a member of the "Engineering" group of an enterprise and may receive health status information that indicates that endpoint device 8 has obsolete antivirus software. In this example; because endpoint device 8 has obsolete antivirus software, PDP 16 may identify a set of access policies that specify that endpoint device 8 is only permitted to communicate on the health evaluation network. However, in this example, if the health status had indicated that endpoint device 8 had up-to-date antivirus software, PDP 16 may identify a set of access policies that specify that endpoint device 8 is permitted to communicate on the health evaluation network and on protected network 6B.

Once PDP 16 has identified a set of access policies to be enforced with regard to endpoint device 8, PDP 16 may cause one or more of PEPs 14 and endpoint defense agent 12 to enforce the identified access policies with regard to endpoint device 8. For example, a first one of these access policies may specify that endpoint device 8 is permitted to communicate on protected network 6B. In addition, a second one of these access policies may specify that endpoint device 8 is not permitted to respond to Transport Control Protocol ("TCP") messages destined for port 110. In this example, PDP 16 may instruct PEP 14A to enforce the first one of the access policies and may instruct endpoint defense agent 12 to enforce the second one of the access policies. If PEP 14A operates at the link layer, PEP 14A may enforce the first one of the access policies by forwarding link-layer frames from endpoint device 8 that specify Media Access Control ("MAC") addresses of devices in protected network 6B. If PEP 14A operates at the network layer, PEP 14A may enforce the first one of the access policies by forwarding network layer packets from endpoint device 8 that specify an Internet Protocol address of a device on protected network 6B. Endpoint defense agent 12 may enforce the second one of the access policies by operating a personal firewall application on endpoint device 8 that drops all TCP messages that specify port 110 as a destination port.

After the initial exchange of identity and health status information, PDP 16 and endpoint device 8 may establish and maintain control channels until user 10 no longer desires to use endpoint device 8 to interact with network resources provided by resource servers 4. In this way, endpoint defense agent 12 may continue to provide health information to PDP 16 and PDP 16 may be continue to update the access policies that are enforced with regard to endpoint device 8. For example, after PDP 16 grants endpoint device 8 access to protected network 6B, user 10 may install software on endpoint device 8 that would enable a hacker to use endpoint device 8 to attack resource server 4N. In this example, endpoint defense agent 12 may send a health status to PDP 16 that indicates that user 10 has installed this software. In response, PDP 16 may identify a new set of access policies that only permits endpoint device 8 to communicate on the health evaluation network.

Endpoint device 8 may be connected to multiple ones of PEPs 14. As illustrated in the example of FIG. 1A, endpoint device 8 is connected to PEP 14A via a wired connection and to PEP 14N via a wireless connection. Because endpoint device 8 may establish connections to more than one of PEPs 14, endpoint device 8 may send multiple access requests to PDP 16. Because endpoint device 8 may send multiple access requests to PDP 16, PDP 16 could potentially identify and attempt to enforce multiple sets of access policies with regard to endpoint device 8. For example, user 10 may provide a first username when endpoint device 8 is establishing a connection through PEP 14A and may use a second username when endpoint device 8 is establishing a connection through PEP 14B. In this example, when PDP 16 identifies a set of access policies associated with the first username, PDP 16 may identify an access policy that requires endpoint defense agent 12 to prevent endpoint device 8 from receiving traffic on port 110. Furthermore, in this example, when PDP 16 identifies a set of access policies associated with the second username, PDP 16 may identify an access policy that requires endpoint defense agent 12 to receive network traffic on port 110. From this example it is apparent that PDP 16 may identify multiple sets of access policies for endpoint device 8 that conflict with one another. For instance, it is not possible for endpoint device 8 to both allow and block network traffic on port 110. This situation could potentially lead to problems.

Endpoint device 8 and PDP 16 use techniques to reconcile differences in access policies. In accordance with these techniques, when PDP 16 receives an access request from endpoint device 8, PDP 16 determines whether a set of access policies is already enforced with regard to endpoint device 8 due to an earlier access request from endpoint device 8. PDP 16 may, for example, determine whether a set of access policies is currently enforced with regard to the endpoint device due to an earlier access request from endpoint device 8 by determining whether PDP 16 has previously received a client identifier from endpoint device 8 and determining that a set of access policies associated with the client identifier is currently enforced.

When PDP 16 determines that a set of access policies are currently enforced with regard to endpoint device 8, PDP 16 identifies a coherent set of access policies. For example, this coherent set of access policies may permit endpoint device 8 to communicate on a coherent set of resource servers on protected networks 6 and may also require endpoint device 8 to comply with a coherent set of endpoint configuration requirements. After identifying this new set of access policies, PDP 16 may instruct PEPs 14 and endpoint defense agent 12 to enforce the identified set of access policies with regard to endpoint device 8. For example, endpoint device 8 and PDP 16 have established a first secure communication session through PEP 14A and PDP 16 has instructed PEP 14A to allow endpoint device 8 to communicate on protected network 6A. In addition, endpoint device 8 and PDP 16 have established a second secure communication through PEP 14N and PDP 16 has instructed PEP 14N to allow endpoint device 8 to communicate on protected network 6B. In this example, PDP 16 may instruct PEP 14A and PEP 14N to allow endpoint device 8 to communicate on both protected network 6A and protected network 6B.

The techniques described in this disclosure may provide one or more advantages. For example, these techniques may eliminate conflicting access policies enforced with regard to endpoint device 8. Conflicting access policies may result in problems that are confusing to the user. For instance, conflicting access policies may prevent an endpoint device from accessing a network using one interface but allow access to the same network through a different network interface on the same endpoint device. Furthermore, conflicting access policies may lead to security problems because it might not be possible to predict which access policies are actually being enforced with regard to an endpoint device. The techniques described in this disclosure may resolve these issues. In accordance with these techniques, only a coherent set of access policies may be enforced with regard to the endpoint device. As used in this disclosure, the term "coherent" refers to a lack of conflicts.

Figure 1B:
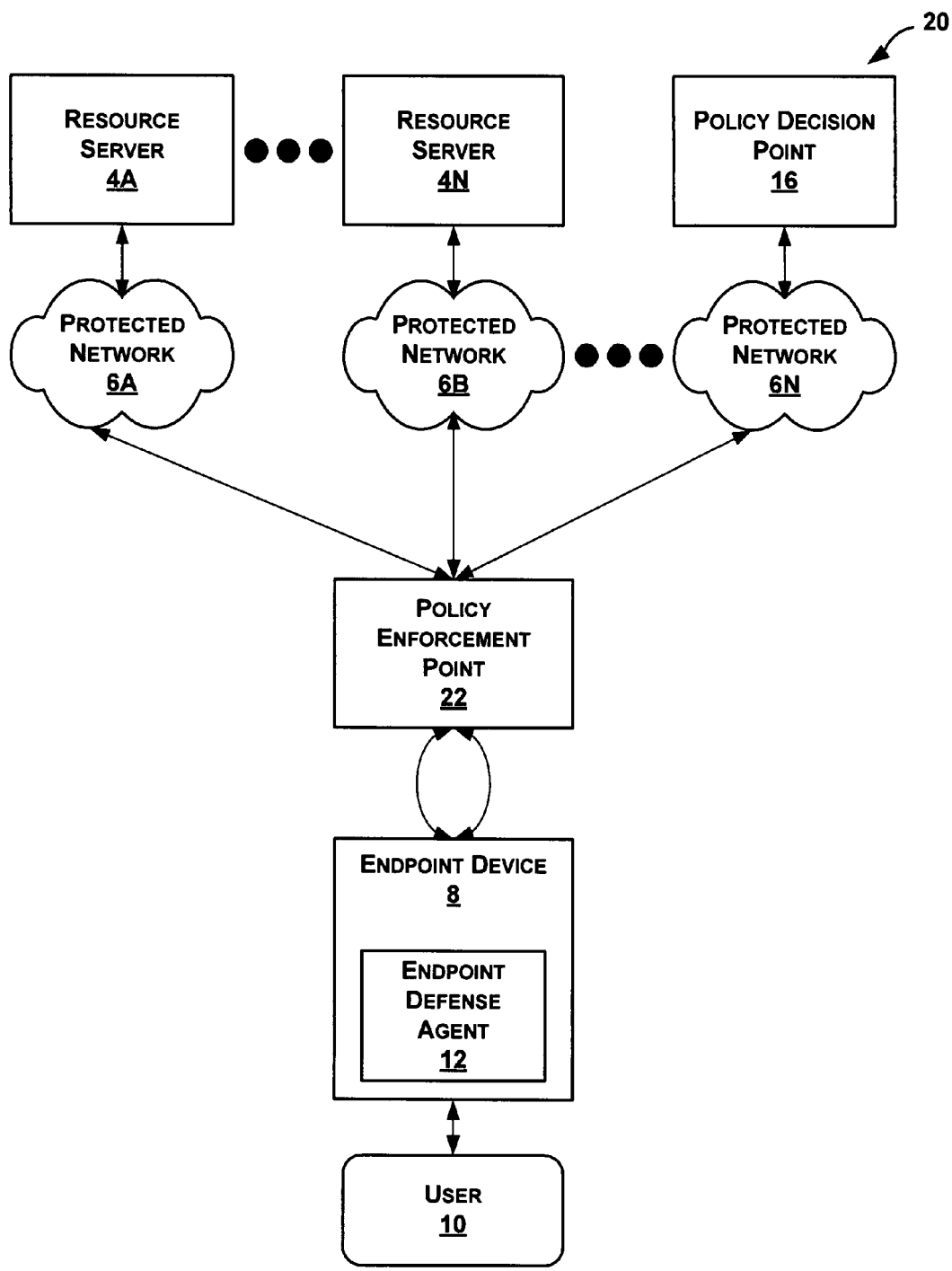
FIG. 1B is a block diagram illustrating a second exemplary system that uses network access control.

FIG. 1B is a block diagram illustrating a second exemplary system 20 that uses network access control. System 20 is similar to system 2 except that system 20 only includes a single PEP 22, rather than the set of PEPs 14A through 14N. In system 20, endpoint device 8 may issue multiple access requests through PEP 22. For instance, endpoint device 8 may issue access requests through PEP 22 using different layers of the OSI network model. For example, endpoint device 8 may issue a first access request using 802.1X and a second access request using a network layer protocol, such as Internet Protocol Security (IPSec).

In system 20, PDP 16 may respond to these multiple access requests in the manner described above. That is, when PDP 16 receives any access request from endpoint device 8, PDP 16 determines whether a set of access policies is currently enforced with regard to endpoint device 8. If a set of access policies is currently enforced with regard to endpoint device 8, PDP 16 may identify a second set of access policies. After identifying the second set of access policies, PDP 16 replaces the first set of access policies with the second set of access policies, so that from then on only access polices in the second set of access policies are enforced with regard to endpoint device 8.

Figure 1C:
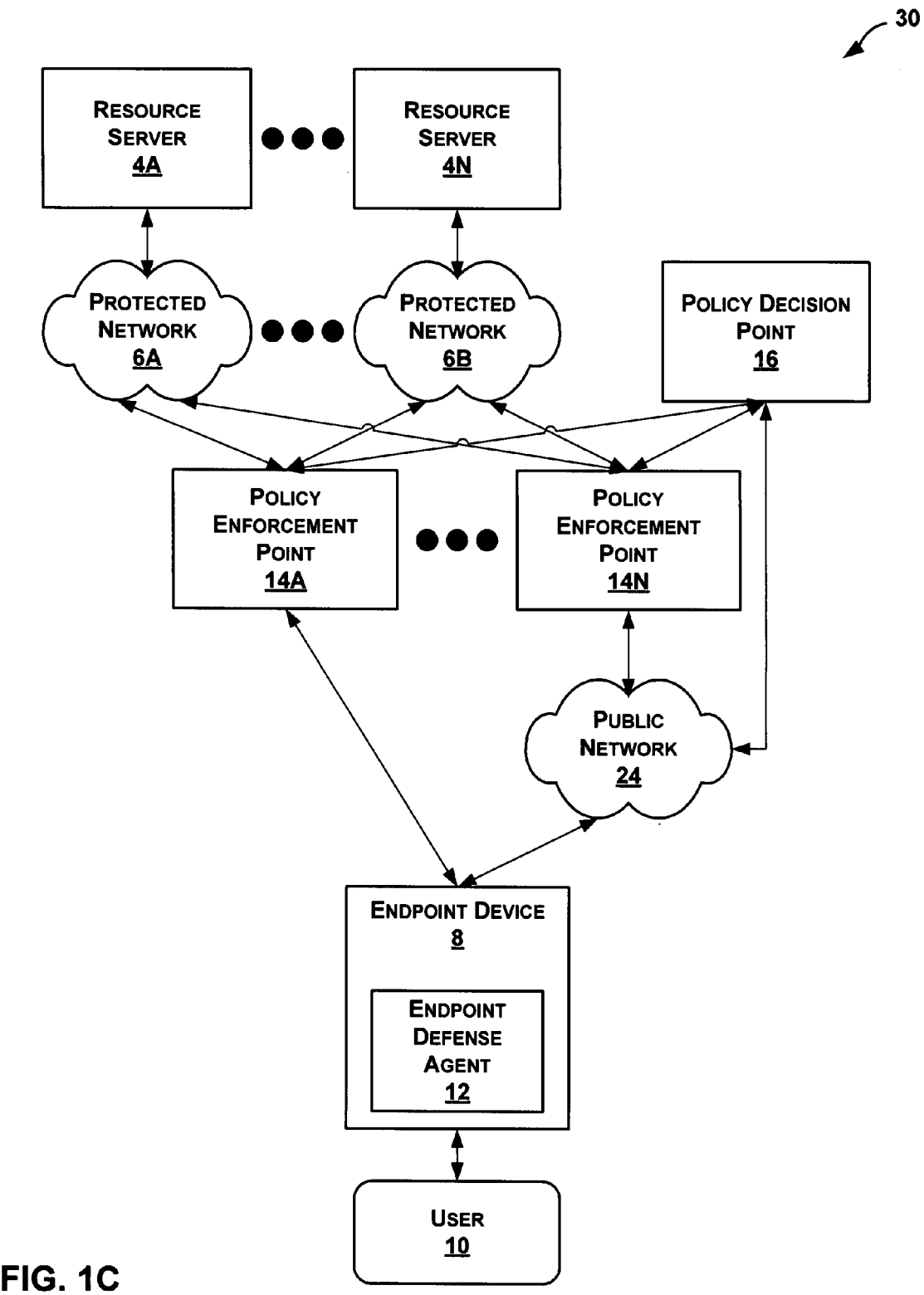
FIG. 1C is a block diagram illustrating a third exemplary system that uses network access control.

FIG. 1C is a block diagram illustrating a third exemplary system 30 that uses network access control. System 30 is similar to system 2 except that in system 30 communications between endpoint device 8 and PDP 16 do not necessarily flow through one of PEPs 14. Rather, communications between endpoint device 8 and PDP 16 may flow through a public network 24. Public network 24 may include any number of intermediate network devices including routers, switches, bridges, and so on. Furthermore, public network 24 may be public in the sense that communications on public network 24 are, by default, considered to be accessible by members of the public. For this reason, endpoint device 8 and PDP 16 may establish a secure communications channel through public network 24 before endpoint device 8 sends an access request to PDP 16. For example, endpoint device 8 and PDP 16 may establish an IPSec communications channel.

In system 30, endpoint device 8 may initially connect to PDP 16 via public network 24 in order to gain access to one of protected networks 6 through a one of PEPs 14 that operates at the network layer. Subsequently, endpoint device 8 may use 802.1X via a one of PEPs 14 that operates at the link layer to connect to PDP 16 in order to gain access to one of protected networks 6 through the one of PEPs 14 that operates at the link layer.

Figure 2:
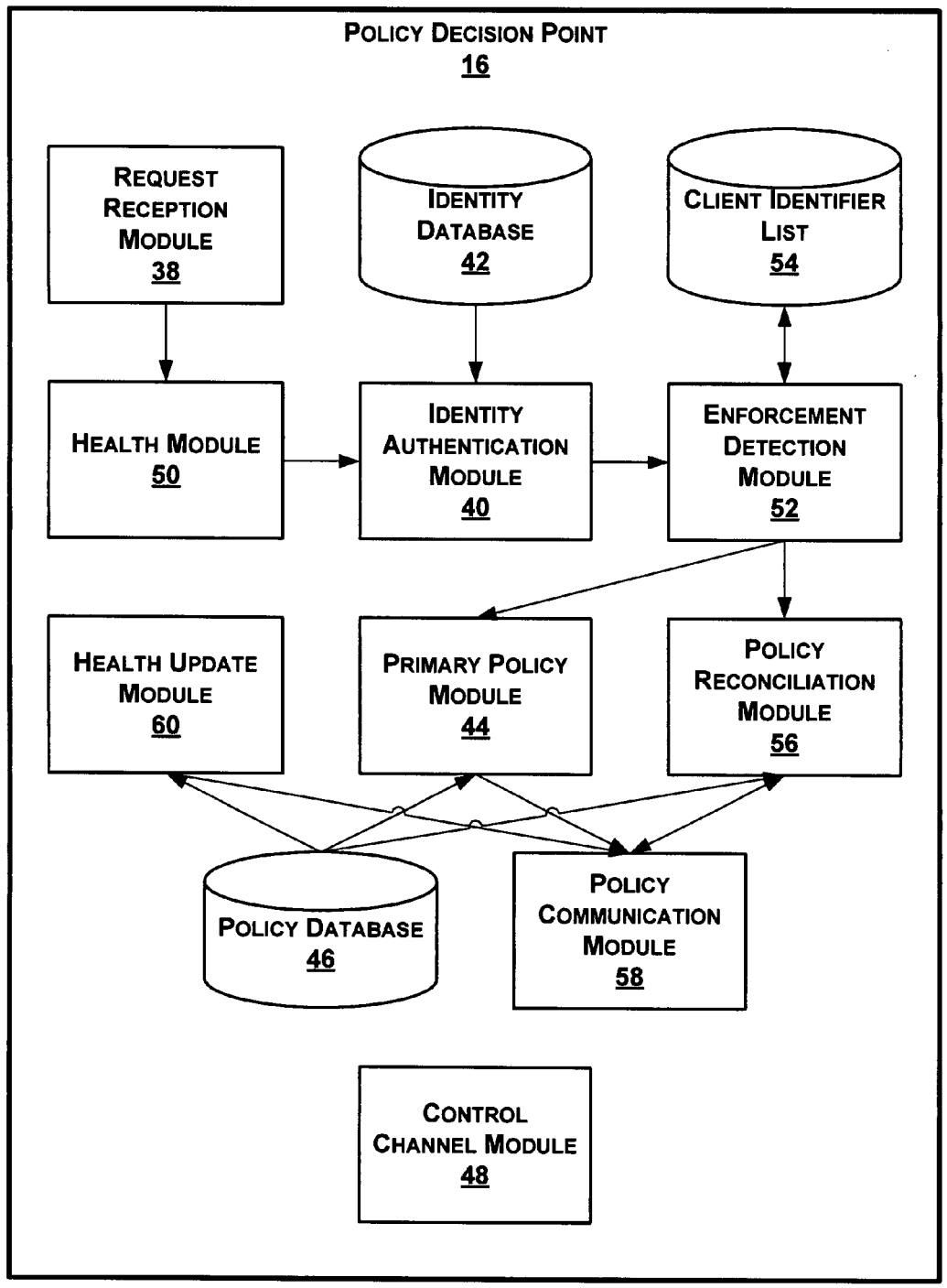
FIG. 2 is a block diagram illustrating exemplary details of a policy decision point.

FIG. 2 is a block diagram illustrating example details of PDP 16. As illustrated in the example of FIG. 2, PDP 16 comprises a request reception module 38 that receives network communications from PEPs 14 and/or endpoints 8. These network communications may include requests from endpoint devices 8 to communicate on protected networks 6.

When request reception module 38 receives a network communication from PEP 14A or endpoint device 8 that includes an access request from endpoint device 8, health module 50 may request and receive a health status report from endpoint defense agent 12 in endpoint device 8. Upon receiving the health status report, health module 50 may determine whether the health status report indicates that endpoint device 8 has a minimum health status. The minimum health status is a health status at which it is safe to request and receive identity information from user 10. For example, it may be unsafe to request the identity information from user 10 when a keystroke logging program is installed on endpoint device 8. If user 10 were to enter a password while the keystroke logging program is active, this keystroke logging program could record this password and transmit the password to a malicious user or program. In some example configurations, however, PDP 16 may request the identity information before requesting the health status report or may request both identity information and a health status report at the same time.

If health module 50 determines that the health status report indicates that endpoint device 8 has the minimum health status, an identity authentication module 40 may request and receive identity information regarding user 10. When authentication module 40 receives the identity information, authentication module 40 may use an identity database 42 to determine whether to accept the identity information. For example, identity database 42 may be a lightweight directory access protocol (LDAP) directory that contains entries that map usernames to passwords. In this example, identity authentication module 40 may use a username specified in the identity information to query the LDAP directory for a password mapped to the username. If the LDAP directory does not contain an entry for the username or the password returned by the LDAP directory does not match the password specified by the identity information, identity authentication module 40 may reject the identity information. Although not shown in the example of FIG. 2, identity authentication module 40 may be a separate identity authentication server that evaluates identity information. This identity authentication server may be a RADIUS server, an LDAP server, a Kerberos server, or another type of authentication server.

If identity authentication module 40 accepts the identity information, an enforcement detection module 52 determines whether a set of access policies is currently enforced with regard to endpoint device 8 due to a previous access request from endpoint device 8.

In accordance with a first technique, enforcement detection module 52 may determine whether a set of access policies is currently enforced with regard to endpoint device 8 due to a previous access request from endpoint device 8 by using a client identifier. For instance, enforcement detection module 52 may request, and subsequently receive a client identifier from endpoint defense agent 12. This client identifier may be one or more sequences of symbols (e.g., a number or string of characters) that are sufficient to identify endpoint device 8 among devices that send access requests to PDP 16. In other words, each endpoint defense agent that communicates with PDP 16 may be associated with a different client identifier. When enforcement detection module 52 receives the client identifier from endpoint defense agent 12, enforcement detection module 52 may determine whether the client identifier is listed in a client identifier list 54. If the received client identifier is not listed in client identifier list 54, enforcement detection module 52 may add the client identifier to client identifier list 54 and determine that no other set of access policies is enforced with regard to endpoint device 8 due to a previous access request from endpoint device 8. If the received client identifier is listed in client identifier list 54, enforcement detection module 52 may increment a counter associated with the client identifier of endpoint device 8 in client identifier list 54 and determine that another set of access policies is currently enforced with regard to endpoint device 8. The counter is a measure of how many active control channels exist between endpoint device 8 and PDP 16. The use of client identifiers in this technique may be necessitated by the fact that endpoint device 8 may use multiple IP addresses (e.g., a different one for each network interface) when communicating with PDP 16.

In accordance with an alternate technique, enforcement detection module 52 may determine whether a set of access policies is currently enforced with regard to endpoint device 8 due to a previous access request from endpoint device 8 by receiving an indication from endpoint defense agent 12 that endpoint defense agent 12 has determined that a set of access policies is currently enforced with regard to endpoint device 8 due to a previous access request from endpoint device 8. In order to enable endpoint defense agent 12 to determine whether another set of access policies is currently enforced with regard to endpoint device 8, enforcement detection module 52 may provide a server identifier to endpoint defense agent 12. The server identifier may be a sequence of symbols (e.g., a number or string of characters) that is unique to PDP 16. In accordance with this alternate technique, when endpoint defense agent 12 receives the server identifier, endpoint defense agent 12 may determine whether the server identifier is listed in a server identifier list (not shown). If endpoint defense agent 12 receives a server identifier that is not listed in the server identifier list, endpoint defense agent 12 may add the server identifier to the server identifier list. On the other hand, if endpoint defense agent 12 receives a server identifier that is listed in the server identifier list, endpoint defense agent 12 may use the control channel to send an indicator to PDP 16. This indicator indicates that endpoint defense agent 12 has determined that a set of access policies is currently enforced with regard to endpoint device 8. The use of server identifiers in this alternate technique may be necessitated by the fact that PDP 16 may use multiple IP addresses (e.g., a different one for each VLAN) when communicating with endpoint device 8.

If enforcement detection module 52 determines that no other set of access policies is currently enforced with regard to endpoint device 8 due to a previous access request from endpoint device 8, a primary policy module 44 in PDP 16 identifies a set of access policies. Primary policy module 44 may identify the set of access policies based on the health status information of endpoint device 8, the identity information provided by the user of endpoint device 8, and possibly other factors. These other factors may include, for example, whether endpoint device 8 is communicating with PDP 16 through a one of PEPs 14 that operates at the link layer or that operates at the network layer, the time of day, the day of the week, month, or year, network utilization rates, the geographic location of endpoint device 8, speed of the network connection to endpoint device 8, and many other factors. Primary policy module 44 may identify a set of access policies for endpoint device 8 by accessing a policy database 46 that stores entries that map information about an endpoint to a set of access policies. For example, policy database 46 may store an entry that maps the identity information provided by authentication module 40 to a set of access policies that includes an access policy that grants endpoint device 8 a right to communicate with devices on the health evaluation network.

On the other hand, if enforcement detection module 52 determines that a set of access policies is currently enforced with regard to endpoint device 8 due to a previous access request from endpoint device 8, a policy reconciliation module 56 in PDP 16 identifies a second set of access policies. The second set of access policies includes one or more access policies to be enforced by PEPs 14. In addition, the second set of access policies includes one or more access policies that require endpoint device 8 to comply with a coherent set of endpoint configuration requirements. Policy reconciliation module 56 may identify the second set of access policies in a variety of ways. In a first example, policy reconciliation module 56 may identify a set of access policies that only include access policies that are already enforced with regard to endpoint device 8. In a second example, policy reconciliation module 56 may identify a set of access policies that include access policies that include only those access policies identified by policy module 44 for the current access request. In a third example, policy reconciliation module 56 may identify a set of access policies that include some access policies that are already enforced with regard to endpoint device 8 and some access policies that policy module 44 identified for the current access request. In this third example, policy reconciliation module 56 may analyze the sets of access policies to identify access policies that do not conflict. In a fourth example, policy reconciliation module 56 may identify a set of access policies that include one or more access policies that are neither in the set of access policies that are already enforced with regard to endpoint device 8 nor in the set of the access policies that policy module 44 identified for the current access request.

After primary policy module 44 has identified the set of access rights for endpoint device 8, a control channel module 48 in PDP 16 works with endpoint defense agent 12 to establish a secure control channel with endpoint defense agent 12. For instance, control channel module 48 may establish a transport layer security ("TLS") session with endpoint defense agent 12. Likewise, after policy reconciliation module 56 identifies the second set of access policies, control channel module 48 in PDP 16 establishes a secure control channel with endpoint defense agent 12.

When the control channel is established, a policy communication module 58 causes PEP 14A and/or endpoint defense agent 12 to enforce set of access rights identified by the primary policy module 44 or policy reconciliation module 56 with regard to endpoint device 8. Policy communication module 58 may cause PEP 14A to enforce an access policy with regard to endpoint device 8 by sending an instruction to PEP 14A that instructs PEP 14A to enforce the access policy with regard to endpoint device 8. Similarly, policy communication module 58 may cause endpoint defense agent 12 to enforce an access policy with regard to endpoint device 8 by sending, via the control channel, an instruction to endpoint defense agent 12 that instructs endpoint defense agent 12 to enforce the access policy with regard to endpoint device 8. When policy communication module 58 causes endpoint defense agent 12 and/or PEPs 14 to enforce the second set of access policies, only access policies in the second set of access policies are enforced with regard to endpoint device 8.

After policy communication module 58 causes a set of access policies to be enforced with regard to endpoint device 8, a health update module 60 in PDP 16 may use the control channel to receive a current health status report from endpoint defense agent 12. When health update module 60 receives the updated health status report from endpoint defense agent 12, health update module 60 may use the updated health status report to identify a new set of access policies. If this new set of access policies is different than the set of access policies currently enforced with regard to endpoint device 8, health update module 60 may instruct policy communication module 58 to cause only policies in the new set of access policies to be enforced with regard to endpoint device 8.

When user 10 decides that access to resources provided by resource servers 4 is no longer necessary, user 10 may cause endpoint device 8 to terminate the control channel. In accordance with the technique that uses client identifier list 54, control channel module 48 may, when a control channel to endpoint device 8 is terminated, decrement the counter associated with the client identifier of endpoint device 8 in client identifier list 54.

Figure 3:
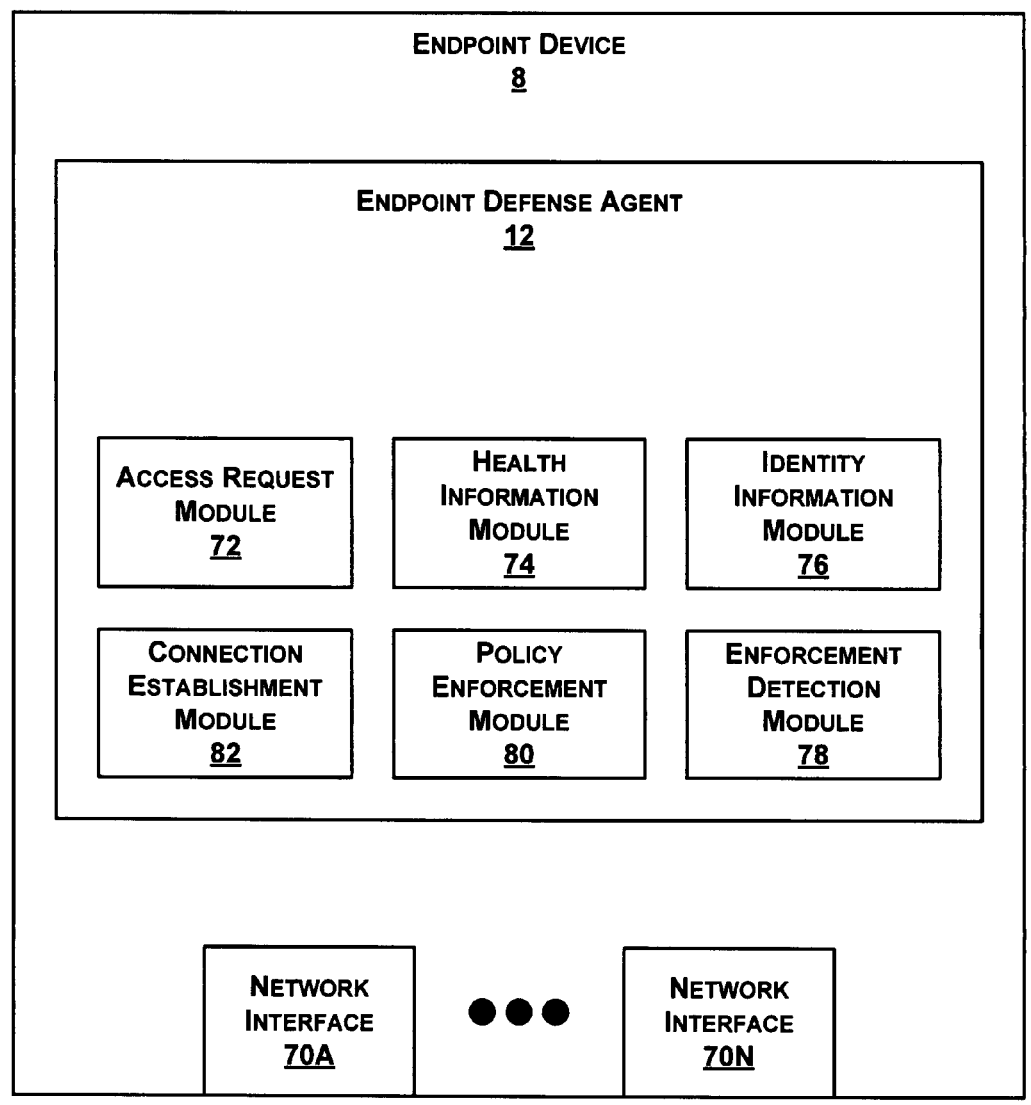
FIG. 3 is a block diagram illustrating exemplary details of an endpoint device.

FIG. 3 is a block diagram illustrating exemplary details of endpoint device 8. As illustrated in the example of FIG. 3, endpoint device 8 includes a set of network interfaces 70A through 70N (collectively, "network interfaces 70"). Network interfaces 70 may be Ethernet cards, Wi-Fi cards, wireless broadband cards, Bluetooth interfaces, or other types of network interfaces. Furthermore, network interfaces 70 may be of different types. For instance, network interface 70A may be an Ethernet card and network interface 70B may be a Wi-Fi card.

Endpoint defense agent 12 comprises an access request module 72. When user 10 wishes to access a resource provided by one of resource servers 4, access request module 72 may form an access request. After forming the access request, access request module 72 may send the access request using a one of network interfaces 70. For instance, if network interface 70A is connected to PEP 14A, access request module 72 may send the access request using network interface 70A. This one of PEPs 14 may then repackage the access request and forward the repackaged access request to PDP 16. Alternatively, in the example of FIG. 1C, access request module 72 may send the access request directly to PDP 16.

After PDP 16 receives the access request, endpoint device 8 may receive a request for a health status report. When endpoint device 8 receives the request for the health status report, a health information module 74 may generate and send the health status report to PDP 16. For example, health information module 74 may be a trusted platform module (TPM). In this example, the TPM may, in a way that cannot be forged, create a TPM register value based on the machine code instructions of the basic input/output system (BIOS), the boot loader, the operating system kernel, the operating system services, and other software applications configured on endpoint device 8. In this example, health information module 74 may send this TPM register value to PDP 16. PDP 16 may be configured to recognize TPM register values associated with proper configurations. As a result, PDP 16 may identify a set of access policies based on the access policies associated with the TPM register value sent by health information module 74.

If PDP 16 determines, based on the health status report, that endpoint device 8 has a minimum health status, endpoint device 8 may receive a request for identity information from PDP 16. When endpoint device 8 receives the request for identity information, an identity information module 76 in endpoint device 8 may request that user 10 provide one or more pieces of identity information. In response to this request, user 10 may provide the requested pieces of identity information to identity information module 76. For example, user 10 may provide a username and password to identity information module 76. In another example, user 10 may present a biometric indicator (e.g., a retina scan, fingerprint, etc.) to identity information module 76. When identity information module 76 receives the pieces of identity information, identity information module 76 may send the pieces of identity information to PDP 16. In some example configurations, PDP 16 may request the identity information before requesting the health status report.

In accordance with the first technique describe above with relation to FIG. 2, an enforcement detection module 78 may send a client identifier to PDP 16. As described above, PDP 16 may use the client identifier to determine whether a set of access policies for endpoint device 8 are already enforced with regard to endpoint device 8.

In accordance with the alternate technique describe above with relation to FIG. 2, enforcement detection module 78 may receive a server identifier from PDP 16. When enforcement detection module 78 receives the server identifier from PDP 16, enforcement detection module 78 may use the server identifier to determine whether a set of access policies is already enforced with regard to endpoint device 8. For example, enforcement detection module 78 may store a list of server identifiers. If the server identifier is on the list of server identifiers, enforcement detection module 78 determines that a set of access policies is already enforced with regard to endpoint device 8.

If enforcement detection module 78 determines that a set of access policies is already enforced with regard to endpoint device 8, enforcement detection module 78 may perform one or more actions to ensure that a set of access policies is enforced with regard to endpoint device 8 that does not include any conflicting, access policies. For example, connection establishment module 82 may decide not to, establish a connection to PDP 16 to avoid receiving a second set of policies from PDP 16. In this way, only the set of access policies that are currently enforced with regard to endpoint device 8 are enforced. In another example, enforcement detection module 78 may send an indicator to PDP 16 that indicates that enforcement detection module 78 has determined that a set of access policies is enforced with regard to endpoint device 8.

After PDP 16 identifies a set of access policies to be enforced with regard to endpoint device 8, endpoint device 8 may receive an invitation from PDP 16 to start a secure control channel. When endpoint device 8 receives the invitation from PDP 16 to start the control channel, a connection establishment module 82 and PDP 16 may interact to establish the control channel.

After the control channel is established, PDP 16 may send one or more access policies to endpoint device 8. When PDP 16 receives access policies from PDP 16, a policy enforcement module 80 in endpoint device 8 enforces the received access policies with regard to endpoint device 8. For example, PDP 16 may identify an access policy that specifies that endpoint device 8 may not disable antivirus software. In this example, policy enforcement module 80 may monitor the antivirus software to ensure that user 10 does not disable the antivirus software. Furthermore, if the antivirus software does become disabled, policy enforcement module 80 may use the control channel to alert PDP 16 that the antivirus software is disabled. In response, PDP 16 may modify the access policies for endpoint device 8 in order to prevent endpoint device 8 from communicating on networks other than the health evaluation network.

A health information module 74 in endpoint device 8 may use the control channel to send health status reports to PDP 16. Because access request module 72 may have made one or more previous access requests, multiple control channels may exist between endpoint device 8 and PDP 16. For this reason, health information module 74 may send the health status reports to PDP 16 via multiple control channels.

Figure 4:
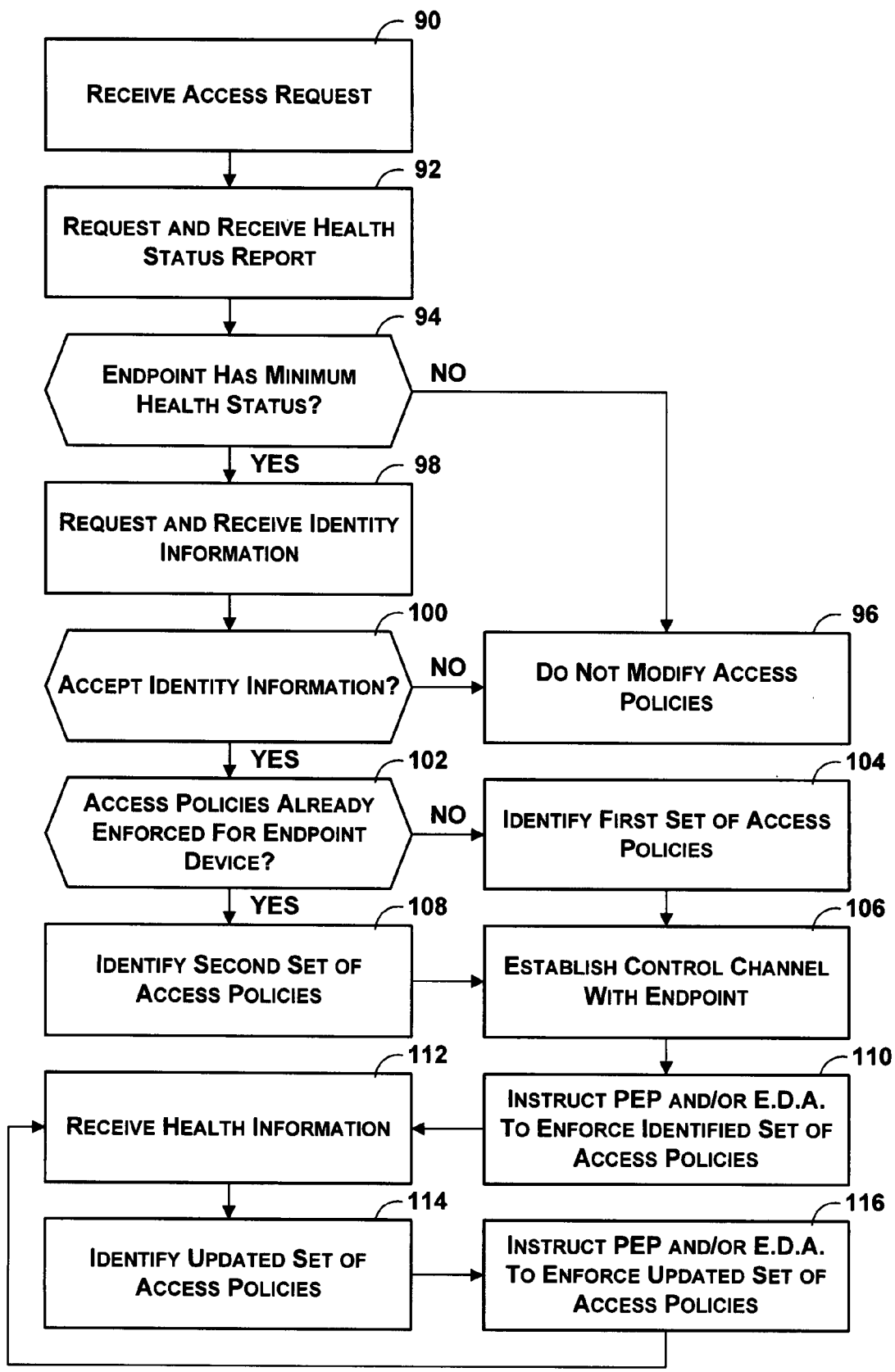
FIG. 4 is a flowchart illustrating an exemplary operation of a policy decision point.

FIG. 4 is a flowchart illustrating an exemplary operation of PDP 16. Initially, request reception module 38 may receive an access request for endpoint device 8 from one of PEPs 14 or directly from endpoint device 8 (90). When request reception module 38 receives the access request, health module 50 in PDP 16 requests, and subsequently receives, a health status report for endpoint device 8 (92). After health module 50 receives the health status report, health module 50 may use the health status report to determine whether endpoint device 8 has a minimum health status (94). If endpoint device 8 does not have the minimum health status ("NO" of 94), PDP 16 does not modify the access policies enforced with regard to endpoint device 8 (96). For instance, access policies that prevent endpoint device 8 from accessing resource servers 4 may already be enforced with regard to endpoint device 8. When endpoint device 8 does not have the minimum health status, PDP 16 does not change these access policies.

On the other hand, if endpoint device 8 has the minimum health status ("YES" of 94), identity authentication module 40 requests, and subsequently receives, one or more pieces of identity information from endpoint device 8 regarding user 10 (98). After identity authentication module 40 receives the pieces of identity information, identity authentication module 40 may determine whether to accept the identity information (100). If identity authentication module 40 does not accept the identity information ("NO" of 100), identity authentication module 40 does not modify which access policies are enforced with regard to endpoint device 8 (96).

If identity authentication module 40 accepts the identity information ("YES" of 100), enforcement detection module 52 determines whether a set of access policies are currently enforced with regard to endpoint device 8 due to an earlier access request from endpoint device 8 (102). In order to determine whether a set of access policies are currently enforced with regard to endpoint device 8 due to an earlier access request from endpoint device 8, enforcement detection module 52 may receive a client identifier from endpoint device 8. Enforcement detection module 52 may then use this client identifier to determine whether a set of access policies are currently enforced with regard to endpoint device 8 due to an earlier access request from endpoint device 8. In another example, enforcement detection module 52 may send a server identifier to endpoint device 8. Endpoint device 8 may then use this server identifier to determine whether a set of access policies are currently enforced with regard to endpoint device 8 due to an earlier access request from endpoint device 8. In this example, enforcement detection module 52 determines that a set of access policies are currently enforced with regard to endpoint device 8 due to an earlier access request from endpoint device 8 when endpoint device 8 sends a message to PDP 16 indicating that endpoint device 8 has determined that a set of access policies are currently enforced with regard to endpoint device 8 due to an earlier access request from endpoint device 8.

If enforcement detection module 52 determines that no set of access policies are currently enforced with regard to endpoint device 8 due to an earlier access request from endpoint device 8 ("NO" of 102), primary policy module 44 identifies a first set of access policies (104). Primary policy module 44 shay use a variety of factors when identifying the first set of non-default access policies, including the identity of user 10, the health status of endpoint device 4, and other factors.

If enforcement detection module 52 determines that a set of access policies are currently enforced with regard to endpoint device 8 due to an earlier access request from endpoint device 8 ("YES" of 102), policy reconciliation module 56 identifies a second set of previously identified access policies due to an earlier access request from endpoint device 8 (108). As discussed above, policy reconciliation module 56 may identify the second set of access policies in a variety of ways. Regardless of the way in which policy reconciliation module 56 identifies the second set of access policies, the second set of access policies does not include any conflicting access policies. In other words, the second set of access policies is coherent.

After policy reconciliation module 56 identifies the second set of access policies or after primary policy module 44 identifies this first set of access policies, control channel module 48 establishes a control channel with endpoint device 8 (106). Because endpoint device 8 has made a previous access request and a set of access policies are currently enforced with regard to endpoint device 8, at least one control channel may already exist between endpoint device 8 and PDP 16. Thus, after control channel module 48 establishes the control channel with endpoint device 8, two or more control channels may exist between endpoint device 8 and PDP 16.

Policy communication module 58 may then cause the second set of access policies to be enforced with regard to endpoint device 8 (110). For instance, policy communication module 58 may use the control channel to cause endpoint defense agent 12 to enforce one or more of the access policies in the second set of access policies. When policy communication module 58 causes the second set of access policies to be enforced with regard to endpoint device 8, the second set of access policies effectively replaces any set of access policies that was previously enforced with regard to endpoint device 8.

Subsequently, health update module 60 may receive an updated health status report from endpoint device 8 via one of the control channels between endpoint device 8 and PDP 16 (112). When health update module 60 receives an updated health status report from endpoint device 8, health update module 60 may identify an updated set of access policies (114). After health update module 60 identifies the updated set of access policies, policy communication module 58 cause the updated set of access policies to be enforced with regard to endpoint device 8 (116). Health update module 60 may continue to receive updated health status reports and identify updated sets of access policies until endpoint device 8 finishes interacting with resources provided by resource servers 4.

Figure 5:
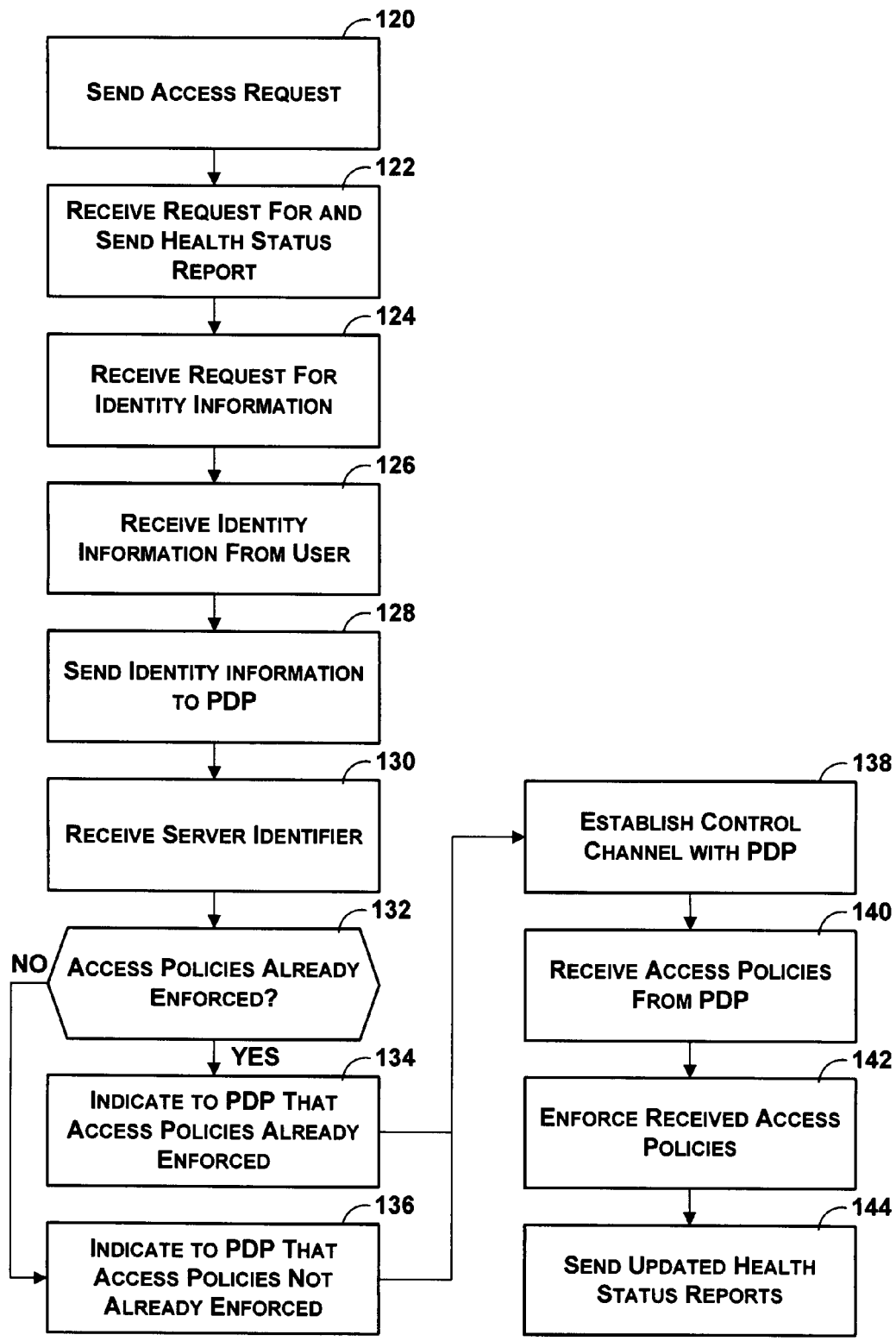
FIG. 5 is a flowchart illustrating an exemplary operation of an endpoint defense agent.

FIG. 5 is a flowchart illustrating an example operation of endpoint defense agent 12. Initially, connection establishment module 82 in endpoint defense agent 12 sends an access request to PDP 16 (120). The access request may be sent directly to PDP 16, or it may pass through one of PEPs 14 via 802.1X, in which case the one of PEPs 14 may then repackage the access request and forward the repackaged access request to PDP 16. For instance, PEP 14A may repackage the identity information in a Remote Access Dial-In User Service (RADIUS) access request packet and send this RADIUS access request packet to PDP 16.

After PDP 16 receives the access request, health information module 74 in endpoint defense agent 12 may receive a request for and, in response, send a health status report regarding endpoint device 8 (122). Next, identity information module 76 may receive a request from PDP 16 for identity information regarding the user of endpoint device 8 (124). When identity information module 76 receives this request, identity information module 76 may request, and subsequently receive, identity information from user 10 (126). For example, connection establishment module 82 may receive a username and password, a biometric indicator, a username and a one-time password, or another type of identity information that identifies user 10 individually or by role. After identity information module 76 receives the identity information from user 10, identity information module 76 may send the identity information to PDP 16 (128). It should also be noted that in some embodiments, PDP 16 may request the identity information before requesting the health status report.

Enforcement detection module 78 in endpoint defense agent 12 may then, in accordance with the alternate technique described above, receive a server identifier from PDP 16 (130). Enforcement detection module 78 may use this server identifier to determine whether a set of access policies is already enforced with regard to endpoint device 8 due to a previous access request from endpoint device 8 (132). If a set of access policies is already enforced with regard to endpoint device 8 due to a previous access request from endpoint device 8 ("YES" of 132), enforcement detection module 78 may send an indicator to PDP 16 that indicates that enforcement detection module 78 has determined that a set of access policies is already enforced with regard to endpoint device 8 due to a previous access request from endpoint device 8. On the other hand, if no set of access policies is already enforced with regard to endpoint device 8 due to a previous access request from endpoint device 8 ("NO" of 132), enforcement detection module 78 may send an indicator to PDP 16 that indicates that enforcement detection module 78 has determined that no access policies are already enforced with regard to endpoint device 8 due to a previous access request from endpoint device 8 (136).

Next, connection establishment module 82 may establish a control channel with PDP 16 (138). Subsequently, policy enforcement module 80 in endpoint defense agent 12 may receive one or more access policies from PDP 16 via the control channel (140). Policy enforcement module 80 may then enforce the access policies received from PDP 16 (142). Health information module 74 may then use the control channel to send updated health status reports to PDP 16 (144). Health information module 74 may send updated health status reports on a periodic basis, in response to requests from PDP 16, in response to changes in the configuration of endpoint device 8, and other potential bases. Because endpoint device may have sent multiple access requests to PDP 16, there may be multiple control channels between PDP 16 and endpoint device 8. For this reason, health information module 74 may send the updated health status reports on multiple control channels.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD); laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various embodiments of the invention have been described. These and other embodiments are within the scope of the following claims.

The invention claimed is:

1. A method comprising:
  receiving a network communication with a network access control policy decision point ("PDP"), wherein the network communication includes a first access request from an endpoint device for access to a network;
  identifying a first set of access policies based on the first access request;
  causing access policies in the first set of access policies to be enforced with regard to the endpoint device;
  while the first set of access policies is being enforced with regard to the endpoint device, receiving another network communication from the endpoint device with the PDP, wherein the other network communication includes a second access request from the endpoint device for access to the same network;
  determining, in response to receiving the second access request, that the first set of access policies is currently enforced with regard to the endpoint device due to the network communication received by the PDP;
  identifying, when the first set of access policies is currently enforced with regard to the endpoint device, a second set of access policies based on the second access request; and
  causing only access policies in the second set of access policies to be enforced with regard to the endpoint device.

2. The method of claim 1, wherein the second access request is for access to the network through a policy enforcement point ("PEP") that enforces access policies at the network layer of the OSI model.

3. The method of claim 2, wherein the first access request is for access to the network through a PEP that enforces access policies at the link layer of the OSI model.

4. The policy decision device of claim 3, wherein the request reception module receives the network communication from a first PEP.

5. The policy decision device of claim 4,
  wherein the first PEP operates at a link layer the open system interconnection ("OSI") network model; and
  wherein the first PEP receives an 802.1X protocol message from the endpoint device, wherein the 802.1X protocol message specifies the request for access to communicate on a network.

6. The method of claim 1, wherein access policies in the first set of access policies and access policies in the second set of access policies are selected from a group consisting of: a set of access policies that specify rights to communicate on networks, a set of access policies that specify rights to communicate with server resources, and endpoint configuration requirements.

7. The method of claim 1, further comprising:
  after identifying the second set of policies, determining, with the PDP, whether one or more access policies of the first set of access policies conflict with one or more access policies of the second set of access policies;
  in response to the PDP determining that one or more access policies conflict, identifying a new set of access policies based on the first set of access policies and the second set of access policies with the PDP, wherein the new set of access policies reconciles the conflicting access policies; and
  causing only access policies in the new set of access policies to be enforced with regard to the endpoint device.

8. The method of claim 1, further comprising:
  establishing a first secure control channel from the PDP to the endpoint device in response to receiving the network communication, wherein the first set of access policies are enforced with regard to the endpoint device via the first secure control channel; and
  in response to determining that the first set of access policies is currently enforced with regard to the endpoint device, establishing a second secure control channel from the PDP to the endpoint device in response to receiving the other network communication,
  wherein causing only access policies in the second set of access policies to be enforced with regard to the endpoint device comprises:
    causing the second set of access policies to be enforced with regard to the endpoint device via the second secure control channel; and
    causing the second set of access policies to be enforced with regard to the endpoint device via the first secure control channel.

9. The method of claim 1, wherein the second set of access policies includes one or more access policies that require one or more policy enforcement points ("PEPs") that enforce access policies with regard to the endpoint device to permit the endpoint device to communicate on the network, wherein the network is protected by the one or more PEPs.

10. The method of claim 1, wherein the second set of access policies includes one or more access policies that require one or more policy enforcement points ("PEPs") that enforce access policies with regard to the endpoint device to permit the endpoint device to communicate with a set of server resources protected by the one or more PEPs.

11. The method of claim 1, wherein the second set of access policies includes one or more access policies that require the endpoint device to comply with a coherent set of endpoint configuration requirements.

12. The method of claim 1,
  wherein the method further comprises receiving information that indicates a health status of the endpoint device; and wherein identifying the second set of access policies comprises identifying the second set of access policies based, at least in part, on the health status of the endpoint device.

13. The method of claim 12,
wherein receiving information that indicates a health status of the endpoint device comprises receiving a trusted platform module ("TPM") register value generated by a TPM chip on the endpoint device; and
wherein identifying the second set of access policies based on the health status of the endpoint device comprises identifying access policies associated with the TPM register value.

14. The method of claim 1,
wherein the method further comprises receiving, from the endpoint device, identity information of a user of the endpoint device; and
wherein identifying the second set of access policies comprises identifying the second set of access policies based, at least in part, on the received identity information.

15. The method of claim 1,
wherein determining whether a first set of access policies is enforced with regard to the endpoint device comprises:
receiving a client identifier from the endpoint device, wherein the client identifier is unique among endpoint devices that request access from the PDP; and
determining that the first set of access policies is currently enforced with regard to the endpoint device when the client identifier is associated with a set of access policies that is currently enforced with regard to the endpoint device.

16. The method of claim 1, wherein determining whether a first set of access policies is enforced with regard to the endpoint device comprises receiving, from the endpoint device, an indicator that indicates that the endpoint device has determined that the first set of access policies is enforced with regard to the endpoint device.

17. The method of claim 16, wherein the method further comprises:
sending, in response to receiving the second access request, a server identifier to the endpoint device,
wherein the server identifier is unique among policy decision points with which the endpoint device communicates; and
wherein the endpoint device uses the server identifier to determine whether the first set of access policies is enforced with regard to the endpoint device.

18. The method of claim 1, wherein the second access request is for access to the network through a first PEP that enforces access policies at the link layer of the OSI model.

19. The method of claim 18, wherein receiving the network communication with the PDP comprises receiving the network communication from the first PEP.

20. The method of claim 19, wherein the method further comprises receiving, with the first PEP, one or more 802.1X protocol messages from the endpoint device, wherein the 802.1X protocol messages specify the access request for access to communicate on a network.

21. The method of claim 18, wherein the first access request was for access to the network through a PEP that enforces access policies at the network layer of the OSI model.

22. A policy decision device comprising:
a request reception module that receives a network communication, wherein the network communication includes a first access request from an endpoint device for access to a network;
a primary policy module that identifies a first set of access policies based on the first access request;
a policy communication module that causes access policies in the first set of access policies to be enforced with regard to the endpoint device, wherein the request reception module receives another network communication from the endpoint device while the first set of access policies is enforced with regard to the endpoint device, and wherein the other network communication includes a second access request from the endpoint device for access to the same network;
an enforcement detection module that determines, in response to receiving the second access request, that the first set of access policies is currently enforced with regard to the endpoint device due to the access request received by the request reception module;
a policy reconciliation module that identifies, when the first set of access policies is currently enforced with regard to the endpoint device, a second set of access policies based on the second access request; and
a policy communication module that causes, when the first set of access policies is currently enforced with regard to the endpoint device, only access policies in the second set of access policies to be enforced with regard to the endpoint device.

23. The policy decision device of claim 22, wherein access policies in the first set of access policies and access policies in the second set of access policies are selected from a group consisting of: a set of access policies that specify rights to communicate on networks, a set of access policies that specify rights to communicate with server resources, and endpoint configuration requirements.

24. The policy decision device of claim 22,
wherein the policy reconciliation module determines whether one or more access policies of the first set of access policies conflict with one or more access policies of the second set of access policies, and, in response to determining that one or more access policies conflict, identifies a new set of access policies based on the first set of access policies and the second set of access policies, wherein the new set of access policies reconciles the conflicting access policies, and
wherein the policy communication module causes only access policies in the new set of access policies to be enforce with regard to the endpoint device.

25. The policy decision device of claim 22, further comprising:
a control channel module that establishes a first secure control channel from the PDP to the endpoint device in response to the request reception module receiving the network communication, and establishes a second secure control channel from the PDP to the endpoint device in response to the request reception module receiving the other network communication,
wherein the policy communication module causes the first set of access policies to be enforced with regard to the endpoint device via the first secure control channel, and wherein the policy communication module causes, when the first set of access policies is currently enforced with regard to the endpoint device, only access policies in the second set of access policies to be enforce with regard to the endpoint device via the first secure control channel and the second secure control channel.

26. The policy decision device of claim 22, wherein the second set of access policies includes one or more access policies that require one or more policy enforcement points ("PEPs") that enforce access policies with regard to the endpoint device to permit the endpoint device to communicate on the network, wherein the network is protected by the one or more PEPs.

27. The policy decision device of claim 22, wherein the second set of access policies includes one or more access policies that require one or more enforcement points ("PEPs") that enforce access policies with regard to the endpoint device to permit the endpoint device to communicate with a set of server resources protected by the one or more PEPs.

28. The policy decision device of claim 22, wherein the second set of access policies includes one or more access policies that require the endpoint device to comply with a coherent set of endpoint configuration requirements.

29. The policy decision device of claim 22,
wherein the policy decision device further comprises a health module that receives information that indicates a health status of the endpoint device; and
wherein the policy reconciliation module identifies the second set of access policies based, at least in part, on the health status of the endpoint device.

30. The policy decision device of claim 29,
wherein the information that indicates a health status of the endpoint includes a trusted platform module ("TPM") register value generated by a TPM chip on the endpoint device; and
wherein the policy reconciliation module identifies the second set of access policies at least in part by identifying access policies associated with the TPM register value.

31. The policy decision device of claim 22,
wherein the policy decision device further comprises an authentication module that receives, from the endpoint device, identity information of a user of the endpoint device; and
wherein the policy reconciliation module identifies the second set of access policies based, at least in part, on the received identity information.

32. The policy decision device of claim 22,
wherein the enforcement detection module determines whether the first set of access policies is enforced with regard to the endpoint device by receiving a client identifier from the endpoint device and by determining that the first set of access policies is currently enforced with regard to the endpoint device when the client identifier is associated with a set of access policies that is currently enforced with regard to the endpoint device,
wherein the client identifier is unique among endpoint devices that request access from the PDP.

33. The policy decision device of claim 22, wherein the enforcement detection module determines that the first set of access policies is enforced with regard to the endpoint device by receiving, from the endpoint device, an indicator that indicates that the endpoint device has determined that the first set of access policies is enforced with regard to the endpoint device.

34. The policy decision device of claim 33,
wherein the enforcement detection module sends a server identifier to the endpoint device,
wherein the server identifier is unique among policy decision devices with which the endpoint device communicates; and
wherein the endpoint device uses the server identifier to determine whether the first set of access policies is enforced with regard to the endpoint device.

35. The policy decision device of claim 22, wherein the second access request is for access to the network through a first PEP that enforces access policies at the link layer of the OSI model.

36. The policy decision device of claim 35, wherein the first access request was for access to the network through a PEP that enforces access policies at the network layer of the OSI model.

37. The policy decision device of claim 22, wherein the second access request is for access to the network through a PEP that enforces access policies at the network layer of the OSI model.

38. The policy decision device of claim 37, wherein the first access request was for access to the network through a PEP that enforces access policies at the link layer of the OSI model.

39. A computer-readable medium comprising instructions, wherein the instructions cause a programmable processor of a network access control policy decision point ("PDP") to:
configure the PDP to receive a network communication, wherein the network communication includes a first access request from an endpoint device for access to a network;
identify a first set of access policies based on the first access request;
cause access policies in the first set of access policies to be enforced with regard to the endpoint device;
while the first set of access policies is being enforced with regard to the endpoint device, configure the PDP to receive another network communication from the endpoint device with the PDP, wherein the other network communication includes a second access request from the endpoint device for access to the same network;
determine, in response to receiving the second access request, that the whether a first set of access policies is currently enforced with regard to the endpoint device due to an earlier network communication received by the PDP;
identify, when the first set of access policies is currently enforced with regard to the endpoint device, a second set of access policies based on the second access request; and
cause only access policies in the second set of access policies to be enforced with regard to the endpoint device.

40. The computer-readable medium of claim 39, wherein the second set of access policies includes one or more access policies that require one or more policy enforcement points ("PEPs") that enforce access policies with regard to the endpoint device to permit the endpoint device to communicate on the network, wherein the network is protected by the one or more PEPs.

41. The computer-readable medium of claim 39,
wherein the instructions further cause the programmable processor to receive information that indicates a health status of the endpoint device; and
wherein the instructions cause the programmable processor to identify the second set of access policies at least in part by causing the programmable processor to identify the second set of access policies based, at least in part, on the health status of the endpoint device.

42. The computer-readable medium of claim 39,
wherein the instructions further cause the programmable processor to receive, from the endpoint device, identity information of a user of the endpoint device; and
wherein the instructions cause the programmable processor to identify the second set of access policies at least in part by causing the programmable processor to identify the second set of access policies based, at least in part, on the received identity information.

43. The computer-readable medium of claim 39,
wherein the instructions cause the programmable processor to determine whether a first set of access policies is enforced with regard to the endpoint device in part by causing the programmable processor to:
receive a client identifier from the endpoint device, wherein the client identifier is unique among endpoint devices that request access from the PDP; and
determine that the first set of access policies is currently enforced with regard to the endpoint device when the client identifier is associated with a set of access policies that is currently enforced.

* * * * *

UNITED STATES PATENT AND TRADEMARK OFFICE
CERTIFICATE OF CORRECTION

Page 1 of 1

PATENT NO. : 7,886,335 B1
APPLICATION NO. : 11/827598
DATED : February 8, 2011
INVENTOR(S) : Roger A. Chickering, Paul Funk and Paul J. Kirner It is certified that error appears in the above-identified patent and that said Letters Patent is hereby corrected as shown below:

In the Claims

Column 22, line 41 (Claim 39), "request, that the whether a first set of" should be
-- request, that the first set of --

Signed and Sealed this
Eighth Day of July, 2014

Michelle K. Lee
*Deputy Director of the United States Patent and Trademark Office*